US009125068B2

(12) United States Patent
Balkwill (10) Patent No.: US 9,125,068 B2
(45) Date of Patent: Sep. 1, 2015

(54) METHODS, SYSTEMS, AND COMPUTER READABLE MEDIA FOR SIMULATING REALISTIC MOVEMENT OF USER EQUIPMENT IN A LONG TERM EVOLUTION (LTE) NETWORK

(75) Inventor: Matthew John Balkwill, Trowbridge (GB)

(73) Assignee: Ixia, Calabasas, CA (US)

( * ) Notice: Subject to any disclaimer, the term of this patent is extended or adjusted under 35 U.S.C. 154(b) by 391 days.

(21) Appl. No.: 13/154,166

(22) Filed: Jun. 6, 2011
(Under 37 CFR 1.47)

(65) Prior Publication Data
US 2012/0150521 A1 Jun. 14, 2012

Related U.S. Application Data

(60) Provisional application No. 61/351,849, filed on Jun. 4, 2010.

(51) Int. Cl.
*H04W 16/22* (2009.01)
*H04W 24/06* (2009.01)

(52) U.S. Cl.
CPC .............. *H04W 16/22* (2013.01); *H04W 24/06* (2013.01); *H04W 16/225* (2013.01)
USPC ........................... 703/13; 455/446; 455/422.1

(58) Field of Classification Search
CPC ..... H04W 24/06; H04W 16/22; H04W 24/00; H04W 28/00; H04W 36/00; H04W 40/00; H04B 17/00
USPC ............. 455/422.1, 436, 67.11; 370/329, 331
See application file for complete search history.

(56) References Cited

U.S. PATENT DOCUMENTS

| 5,530,917 A | 6/1996 | Andersson et al. |
| 5,539,749 A | 7/1996 | Eul |

(Continued)

FOREIGN PATENT DOCUMENTS

| JP | 2009-065488 A | 3/2009 |
| JP | WO 2012/117147 A1 | 9/2012 |

(Continued)

OTHER PUBLICATIONS

"Network Topology"—Wikipedia, Dec. 19, 2008.*

(Continued)

*Primary Examiner* — Kandasamy Thangavelu
(74) *Attorney, Agent, or Firm* — Jenkins, Wilson, Taylor & Hunt, P.A.

(57) ABSTRACT

Methods, systems, and computer readable media for simulating realistic movement of user equipment in an LTE network are disclosed. According to one method, a logical topology of a long term evolution (LTE) access network is defined that includes defining connections between one or more eNodeBs (eNBs). A physical topology of the LTE access network is defined that includes defining locations of the eNBs and sectors, where the physical network topology is mapped to the logical network topology. One or more problem areas are defined within the physical network topology, where the one or more problem areas include locations where signal quality is degraded. One or more paths are defined through the physical network topology. A traffic profile for a user equipment (UE) device is defined. A plurality of messages is generated for simulating the movement of a UE device along a path through the physical network topology.

27 Claims, 5 Drawing Sheets

(56) References Cited

U.S. PATENT DOCUMENTS

| | | | |
|---|---|---|---|
| 5,561,841 A * | 10/1996 | Markus | 455/446 |
| 5,596,570 A | 1/1997 | Soliman | |
| 5,850,386 A | 12/1998 | Anderson et al. | |
| 5,867,791 A | 2/1999 | Chambert | |
| 6,018,521 A | 1/2000 | Timbs et al. | |
| 6,125,072 A | 9/2000 | Wu | |
| 6,163,547 A | 12/2000 | De Vriendt et al. | |
| 6,292,667 B1 | 9/2001 | Wallentin et al. | |
| 6,308,065 B1 | 10/2001 | Molinari et al. | |
| 6,374,112 B1 | 4/2002 | Widegren et al. | |
| 6,445,683 B1 | 9/2002 | Nobuyasu et al. | |
| 6,456,675 B2 | 9/2002 | Wagner et al. | |
| 6,466,556 B1 | 10/2002 | Boudreaux | |
| 6,490,315 B2 | 12/2002 | Katz et al. | |
| 6,519,461 B1 | 2/2003 | Andersson et al. | |
| 6,587,457 B1 | 7/2003 | Mikkonen | |
| 6,594,240 B1 | 7/2003 | Chuah et al. | |
| 6,594,241 B1 | 7/2003 | Malmlöf | |
| 6,771,957 B2 * | 8/2004 | Chitrapu | 455/423 |
| 6,996,772 B2 | 2/2006 | Justice et al. | |
| 7,543,054 B1 | 6/2009 | Bansod et al. | |
| 7,558,565 B2 | 7/2009 | Miller et al. | |
| 7,765,313 B2 | 7/2010 | Jain et al. | |
| 7,889,663 B1 | 2/2011 | Wright et al. | |
| 8,601,585 B2 | 12/2013 | Beddoe et al. | |
| 8,693,571 B2 | 4/2014 | Sorrentino | |
| 8,793,117 B1 * | 7/2014 | Varshney et al. | 703/21 |
| 8,855,070 B2 | 10/2014 | Deng et al. | |
| 8,892,829 B2 | 11/2014 | Asokan | |
| 8,908,535 B2 | 12/2014 | Campbell et al. | |
| 9,071,995 B2 | 6/2015 | Asokan et al. | |
| 2002/0012380 A1 | 1/2002 | Hottinen et al. | |
| 2002/0021698 A1 | 2/2002 | Lee et al. | |
| 2002/0183053 A1 | 12/2002 | Gopalakrishna et al. | |
| 2003/0036403 A1 | 2/2003 | Shiu et al. | |
| 2004/0214564 A1 | 10/2004 | Rosen et al. | |
| 2006/0229018 A1 | 10/2006 | Mlinarsky et al. | |
| 2006/0234636 A1 | 10/2006 | Miller et al. | |
| 2006/0262880 A1 | 11/2006 | Mizuta et al. | |
| 2006/0276195 A1 * | 12/2006 | Nordling | 455/446 |
| 2007/0091921 A1 | 4/2007 | Elliot et al. | |
| 2009/0052473 A1 | 2/2009 | Choi et al. | |
| 2009/0077456 A1 | 3/2009 | Pi et al. | |
| 2009/0077457 A1 | 3/2009 | Ramesh et al. | |
| 2009/0100300 A1 | 4/2009 | Kim | |
| 2009/0109926 A1 * | 4/2009 | Meylan | 370/331 |
| 2009/0196244 A1 | 8/2009 | Chun et al. | |
| 2009/0245187 A1 | 10/2009 | Nam et al. | |
| 2010/0075678 A1 * | 3/2010 | Akman et al. | 455/436 |
| 2010/0165847 A1 | 7/2010 | Kamuf et al. | |
| 2010/0184447 A1 | 7/2010 | Miki et al. | |
| 2010/0195743 A1 | 8/2010 | Barsoum et al. | |
| 2010/0272011 A1 | 10/2010 | Palanki et al. | |
| 2010/0290371 A1 | 11/2010 | Beale | |
| 2010/0303011 A1 | 12/2010 | Pan et al. | |
| 2011/0032925 A1 | 2/2011 | Lee et al. | |
| 2011/0044196 A1 | 2/2011 | Ishii | |
| 2011/0076962 A1 | 3/2011 | Chen et al. | |
| 2011/0086659 A1 | 4/2011 | Yoon et al. | |
| 2011/0119552 A1 | 5/2011 | Park et al. | |
| 2011/0158333 A1 | 6/2011 | Nakano et al. | |
| 2011/0170439 A1 | 7/2011 | Miki et al. | |
| 2011/0199985 A1 * | 8/2011 | Cai et al. | 370/329 |
| 2011/0206151 A1 | 8/2011 | McCloud et al. | |
| 2011/0223900 A1 * | 9/2011 | Yu et al. | 455/422.1 |
| 2011/0235586 A1 | 9/2011 | Han et al. | |
| 2011/0287721 A1 | 11/2011 | Haran | |
| 2011/0294497 A1 * | 12/2011 | Hedlund et al. | 455/422.1 |
| 2011/0302390 A1 | 12/2011 | Copeland et al. | |
| 2012/0033650 A1 | 2/2012 | Ahn et al. | |
| 2012/0039246 A1 | 2/2012 | Zhang et al. | |
| 2012/0042226 A1 | 2/2012 | Ramesh et al. | |
| 2012/0051271 A1 | 3/2012 | Beale | |
| 2012/0063384 A1 | 3/2012 | Bi et al. | |
| 2012/0093249 A1 | 4/2012 | Sun et al. | |
| 2012/0094651 A1 | 4/2012 | Chun et al. | |
| 2012/0170524 A1 | 7/2012 | Ren et al. | |
| 2012/0204081 A1 | 8/2012 | Fresia et al. | |
| 2012/0309323 A1 | 12/2012 | Guo et al. | |
| 2013/0010724 A1 | 1/2013 | Han et al. | |
| 2013/0024753 A1 | 1/2013 | Masuda et al. | |
| 2013/0034062 A1 | 2/2013 | Seo et al. | |
| 2013/0058240 A1 | 3/2013 | Kim et al. | |
| 2013/0058294 A1 | 3/2013 | Miki et al. | |
| 2013/0058306 A1 | 3/2013 | Noh et al. | |
| 2013/0060735 A1 | 3/2013 | Haddy et al. | |
| 2013/0064203 A1 | 3/2013 | Ogawa | |
| 2013/0070689 A1 | 3/2013 | Liu et al. | |
| 2013/0070690 A1 | 3/2013 | Moon et al. | |
| 2013/0088973 A1 | 4/2013 | Yang et al. | |
| 2013/0115987 A1 | 5/2013 | Yoo et al. | |
| 2013/0121168 A1 | 5/2013 | Luo et al. | |
| 2013/0121295 A1 | 5/2013 | Saito et al. | |
| 2013/0155867 A1 | 6/2013 | Asokan et al. | |
| 2013/0155872 A1 | 6/2013 | Subramanian et al. | |
| 2013/0155878 A1 | 6/2013 | Deng et al. | |
| 2013/0184023 A1 | 7/2013 | Asokan et al. | |
| 2013/0208600 A1 | 8/2013 | Campbell et al. | |
| 2013/0208603 A1 | 8/2013 | Choi et al. | |
| 2013/0227092 A1 | 8/2013 | Maestas | |
| 2013/0227233 A1 | 8/2013 | Asokan | |
| 2013/0275606 A1 | 10/2013 | Iyer | |
| 2014/0269861 A1 | 9/2014 | Asokan et al. | |
| 2014/0321303 A1 | 10/2014 | Iyer et al. | |
| 2014/0341052 A1 | 11/2014 | Devarasetty et al. | |
| 2015/0043356 A1 | 2/2015 | Awano et al. | |

FOREIGN PATENT DOCUMENTS

| | | |
|---|---|---|
| WO | WO 02/098151 A1 | 12/2002 |
| WO | WO 2014/176376 A1 | 10/2014 |
| WO | WO 2014/186747 A1 | 11/2014 |

OTHER PUBLICATIONS

Xiao et al., IMS Network Deployment Cost Optimization Based on Flow-Based Traffic Model, 2010 IEEE/IFIP Network Operations and Management Symposium, Apr. 19-23, 2010.*

Ikuno et al., System Level Simulation of LTE Networks, 2010 IEEE 71st Vehicular Technology Conference, May 16-19, 2010.*

Commonly assigned, co-pending U.S. Appl. No. 13/447,160 for "Methods, Systems, and Computer Readable Media for Heuristics-Based Adaptive Protocol Parsing," (Unpublished, filed Apr. 13, 2012).

Commonly assigned, co-pending U.S. Appl. No. 13/431,975 for "Methods, Systems, and Computer Readable Media for Dynamically Controlling a Turbo Decoding Process in a Long Term Evolution (LTE) Multi-User Equipment (UE) Traffic Simulator," (Unpublished, filed Mar. 28, 2012).

Commonly assigned, co-pending U.S. Appl. No. 13/429,384 for "Scalable Architecture for Multiple User Equipment (Multi-UE) Simulation," (Unpublished, filed Mar. 25, 2012).

Commonly assigned, co-pending U.S. Appl. No. 13/408,787 for "Methods, Systems, and Computer Readable Media for Integrated Sub-Block Interleaving and Rate Matching," (Unpublished, filed Feb. 29, 2012).

Commonly assigned, co-pending U.S. Appl. No. 13/396,577 for "Methods, Systems, and Computer Readable Media for Performing Long Term Evolution (LTE) Channel Delineation," (Unpublished, filed Feb. 14, 2012).

Commonly assigned, co-pending U.S. Appl. No. 13/371,389 for "Methods, Traffic Simulators, and Computer Readable Media for Validating Long Term Evolution (LTE) Code Blocks and Transport Blocks," (Unpublished, filed Feb. 10, 2012).

Commonly assigned, co-pending U.S. Appl. No. 13/352,058 for "Methods, Systems, and Computer Readable Media for Long Term Evolution (LTE) Uplink Data Processing," (Unpublished, filed Jan. 17, 2012).

Commonly assigned, co-pending U.S. Appl. No. 13/336,005 for "Methods, Systems, and Computer Readable Media for Reducing the

(56) References Cited

OTHER PUBLICATIONS

Impact of False Downlink Control Information (DCI) Detection in Long Term Evolution (LTE) Physical Downlink Control Channel (PDCCH) Data," (Unpublished, filed Dec. 23, 2011).
Commonly assigned, co-pending U.S. Appl. No. 13/326,264 for "Methods, Systems, and Computer Readable Media for Improved Long Term Evolution (LTE) Hybrid Automatic Repeat Request (HARQ) Processing," (Unpublished, filed Dec. 14, 2011).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," TS 36.300 v9.9.0 (Dec. 2011).
"3rd Generation Partnership Project; Universal Mobile Telecommunications System (UMTS); Evolved Universal Terrestrial Radio Access (E-UTRA); Physical layer for relaying operation (Release 10)," 3 GPP TS 36.216, v10.3.1 (Sep. 2011).
"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).
"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).
"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).
Third Generation Partnership Project, "Technical Specification Group Radio Access Network; Evolved Universal Terrestrial Radio Access (E-UTRA); LTE Physical Layer; General Description," 3GPP TS 36.201 v10.0.0, Release 10 (Dec. 2010).
"IxCatapult Chassis," http://www.ixiacom.com/products/display?skey=ixcatapult, pp. 1-2 (Downloaded from the Internet Apr. 14, 2010).
"Wireless Network Testing," Ixia, 915-2623-01 Rev A, pp. 1-18 (Jan. 2010).
"Wireless Network Testing," Ixia, 915-2622-01 Rev A, pp. 1-16 (Jan. 2010).
"3rd Generation Partnership Project; Technical Specification Group Radio Access Network; Requirements for Evolved UTRA (E-UTRA) and Evolved UTRAN (E-UTRAN) (Release 9)," 3GPP TR 25.913, v9.0.0 (Dec. 2009).
"PDCCH Blind Decoding," PDCCH Decoding Example, http://www.steepestascent.com, pp. 1-6 (Copyright 2009-2011, downloaded from the Internet Dec. 4, 2011).
Non-Final Office Action for U.S. Appl. No. 13/431,975 (May 24, 2013).
Notice of Allowance and Fee(s) Due for U.S. Appl. No. 13/396,577 (Dec. 18, 2013).
Non-Final Office Action for U.S. Appl. No. 13/447,160 (Nov. 8, 2013).
Non-Final Office Action for U.S. Appl. No. 13/431,975 (Oct. 10, 2013).
Non-Final Office Action for U.S. Appl. No. 13/326,264 (Oct. 10, 2013).
Non-Final Office Action for U.S. Appl. No. 13/396,577 (Aug. 8, 2013).
Radio Electronics, "LTE CA: Carrier Aggregation Tutorial," pp. 1-7 http://www.radio-electronics.com/info/cellulartelecomms/lte-long-term-evolution/4g-lte-advanced-carrier-channel-aggregation.php (Printed from the Internet Aug. 7, 2013).
Share Technote, "Frame Structure—Downlink," pp. 1-11 http://www.sharetechnote.com/html/FrameStructure_DL.html#PCFICH (Printed from the Internet Aug. 7, 2013).
Non-Final Office Action for U.S. Appl. No. 13/336,005 (Jul. 2, 2013).
Commonly assigned, co-pending U.S. Appl. No. 13/835,658 for "Methods, Systems, and Computer Readable Media for Utilizing Adaptive Symbol Processing in a Multiple User Equipment (Multi-UE) Simulator," (unpublished, filed Mar. 15, 2013).
3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).
3rd Generation Partnership Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).
3rd Generation Partnership Project, "Technical Specification Group Radio Access Network; Evolved Universal Terrestrial Radio Access (E-UTRA); Physical Channels and Modulation (Release 11)," 3GPP TS 36.211, V11.2.0, pp. 1-109 (Feb. 2013).
3rd Generation Partnership Project, "Technical Specification Group Radio Access Network; Evolved Universal Terrestrial Radio Access (E-UTRA); Physical layer; Measurements (Release 11)," 3GPP TS 36.214, V11.1.0, pp. 1-14 (Dec. 2012).
3rd Generation Partnership Project, "Technical Specification Group Radio Access Network; Evolved Universal Terrestrial Radio Access (E-UTRA); LTE physical layer; General description (Release 11)," 3GPP TS 36.201, V11.1.0, pp. 1-13 (Dec. 2012).
3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).
Non-Final Office Action for U.S. Appl. No. 13/429,384 (Apr. 9, 2014).
Final Office Action for U.S. Appl. No. 13/447,160 (Mar. 18, 2014).
Final Office Action for U.S. Appl. No. 13/336,005 (Feb. 26, 2014).
Interview Summary for U.S. Appl. No. 13/447,160 (Feb. 25, 2014).
Final Office Action for U.S. Appl. No. 13/326,264 (Feb. 20, 2014).
Non-Final Office Action for U.S. Appl. No. 13/408,787 (Feb. 3, 2014).
Notice of Allowance and Fee(s) Due for U.S. Appl. No. 13/431,975 (Jan. 22, 2014).
3rd Generation Partnership Project, "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).
Abbes et al., "Protocol Analysis in Intrusion Detection Using Decision Tree," IEEE, Proceedings of the International Conference on Information Technology: Coding and Computing (ITCC'04), pp. 1-5 (2004).
Notice of Allowance and Interview Summary of U.S. Appl. No. 13/352,058 (Feb. 5, 2015).
Final Office Action for U.S. Appl. No. 13/447,160 (Dec. 19, 2014).
Non-Final Office Action and Examiner-Initated Interview Summary for U.S. Appl. No. 13/336,005 (Dec. 5, 2014).
Final Office Action for U.S. Appl. No. 13/429,384 (Nov. 21, 2014).
Dahlman et al., "10.4.9: Blind Decoding of PDCCHs," 4G LTE / LTE-Advanced for Mobile Broadband, pp. 199-202 (2011).
"DCT2000 LTE UE Simulation API Manual," Release 17.1, Catapult Communications, pp. 1-106 (May 2009).
"Catapult Communications Announces High-Capacity LTE UE Simulation Test System," Catapult Communications Corporation, pp. 1-2 (Feb. 9, 2009).
Dutta et al., "A Tight Lower Bound for Parity in Noisy Communcations Networks," Tata Institute of Fundamental Research, pp. 1056-1065 (2008).
"LTE (Long Term Evolution) Testing Systems," http://www.catapult.com/technologies/tech_lte.htm, pp. 1-2 (Jun. 26, 2008).
Notification of Transmittal of the International Search Report and the Written Opinion of the International Searching Authority for International Application No. PCT/US2014/038462 (Sep. 24, 2014).
Notification of Transmittal of the International Search Report and the Written Opinion of the International Searching Authority, or the Declaration for International Application No. PCT/US2014/035204 (Aug. 22, 2014).
Overview of 3GPP Release 10 V0.2.0 (Mar. 2014).

(56) References Cited

OTHER PUBLICATIONS

"LTE and LTE-A Products,"Part No. 46891/580, Issue 3, pp. 1-16 (Jan. 2013).
"Infrastructure Test System, TM500 LTE-A, 3GPP LTE Test," Part No. 46900/003, Issue 1, pp. 1-8 (Oct. 2012).
"Aeroflex Launches TM500 LTE-A Test Mobile," http://www.evaluationengineering.com/news/aeroflex-launches-tm500-lte-a-test-mobile.php, p. 1 (Jul. 19, 2012).
Non-Final Office Action for U.S. Appl. No. 09/866,955 (Dec. 31, 2013).
Notification of Transmittal of the International Search Report or the Declaration for International Application No. PCT/US02/16638 (Oct. 29, 2002).
"Universal Mobile Telecommunications (UMTS) Protocols and Protocol Testing, " International Engineering Consortium, http://www.iec.org/online/tutorials/UMTS/topic04.html, pp. 1-3 (2001).
"Universal Mobile Telecommunications System (UMTS) Protocols and Protocol Testing," International Engineering Consortium, http://www.iec.org/online/tutorials/UMTS/topic02.html, pp. 1-7 (2001).
"Universal Mobile Telecommunications System (UMTS); UTRAN Iub Interface User Plane Protocols for Common Transport Channel Data Streams (3GPP TS 25.435 version 3.5.0 Release 1999)," ETSI TS 125 435 V3.5.0 (Dec. 2000).
"Universal Mobile Telecommunications System (UMTS); UTRAN Iub Interface Data Transport and Transport Signalling for Common Transport Channel Data Streams (3GPP TS 35.434 version 3.4.0 Release 1999)," ETSI TS 125 434 V3.4.0 (Dec. 2000).
"Universal Mobile Telecommunications System (UMTS); UTRAN Iub Interface NBAP Signalling (3GPP TS 25.433 version 3.4.1 Release 1999)," ETSI TS 125 433 V3.4.1 (Dec. 2000).
"Universal Mobile Telecommunications Systems (UMTS); UTRAN Iub/Iur Interface User Plane Protocol for DCH Data Streams (3GPP TS 25.427 version 3.5.0 Release 1999)," ETSI TS 125 427 V3.5.0 (Dec. 2000).
"Universal Mobile Telecommunications System (UMTS);UTRAN Iur and Iub Interface Data Transport Signalling for DCH Data Streams (3GPP TS 25.426 version 3.5.0 Release 1999)," ETSI TS 125 426 V3.5.0 (Dec. 2000).
"Universal Mobile Telecommuncations System (UMTS); UTRAN Overall Description (3GPP TS 25.401 version 3.5.0 Release 1999)," ETSI TS 125 401 V3.5.0 (Dec. 2000).
"Universal Mobile Telecommunications System (UMTS); RRC Protocol Specification (3GPP TS 25.331 version 3.5.0 Release 1999)," ETSI TS 125 331 V3.5.0 (December 2000).
"Universal Mobile Telecommunications System (UMTS); RLC Protocol specification (3GPP TTS 25.322 version 3.5.0 Release 1999)," ETSI TS 125 322 V3.5.0 (Dec. 2000).
"Universal Mobile Telecommunication System (UMTS); MAC protocol specification (3GPP TS 25.321 version 3.5.0 Release 1999)," ETSI TS 125 321 V3.6.0 (Dec. 2000).
Kwon et al., "Performance Comparison of RAN-CN Protocol Stacks in IMT-2000 Networks," IEEE, pp. 2370-2374 (2000).
Weiss, "Designing Macroscopic Diversity Cellular Systems,"IEEE, pp. 2054-2058 (1999).
Lee et al., "Effect of Soft and Softer Handoffs on CDMA System Capacity,"IEEE Transactions on Vehicular Technology, Vol. 47, No. 3, pp. 830-841 (Aug. 1998).
Marchent et al., "Handover and Macro Diversity for 3rd Generation Mobile Systems within ATM Fixed Networks," IEEE, pp. 1151-1155 (1996).
Advisory Action Before the Filing of an Appeal Breif for U.S. Appl. No. 13/447,160 (Mar. 5, 2015).
Advisory Action Before the Filing of an Appeal Breif, Examiner-Initiated Interview Summary and AFCP 2.0 Decision for U.S. Appl. No. 13/429,384 (Mar. 3, 2015).
Notice of Allowance and Fee(s) Due for U.S. Appl. No. 13/835,658 (Apr. 3, 2015).
Applicant-Initiated Interview Summary for U.S. Appl. No. 13/447,160 (Mar. 26, 2015).
Schwarz et al., "Pushing the Limits of LTE: A Survey on Research Enhancing the Standard," IEEE Access, vol. 1, pp. 51-62 (May 10, 2013).
Piro et al., "Simulating LTE Cellular Systems: An Open-Source Framework," IEEE Transactions on Vehicular Technology, vol. 60, No. 2, pp. 498-513 (Feb. 2011).
Notice of Allowance and Fee(s) Due for U.S. Appl. No. 13/429,384 (Jun. 10, 2015).
Notice of Allowance and Fee(s) Due for U.S. Appl. No. 13/447,160 (Apr. 30, 2015).
Nilsson et al., "The Scalable Tree Protocol—A Cache Coherence Approach for Large-Scale Multiprocessors," IEEE, pp. 498-506 (1992).

* cited by examiner

METHODS, SYSTEMS, AND COMPUTER READABLE MEDIA FOR SIMULATING REALISTIC MOVEMENT OF USER EQUIPMENT IN A LONG TERM EVOLUTION (LTE) NETWORK

PRIORITY CLAIM

This application claims the benefit of U.S. Provisional Patent Application Ser. No. 61/351,849, filed Jun. 4, 2010; the disclosure of which is incorporated herein by reference in its entirety.

TECHNICAL FIELD

The subject matter described herein relates to user equipment simulation in an LTE network. More specifically, the subject matter relates to methods, systems, and computer readable media for simulating realistic movement of user equipment in an LTE network.

BACKGROUND

As the number of users connected to mobile networks increases, so too does the need to ensure reliable and efficient operation of mobile network equipment. Therefore, mobile network operators typically simulate various network conditions before equipment is deployed in a live network. Simulated network conditions may include, for example, generating traffic mix simulation for real-live scenarios such as: registering/de-registering and handover for a mix of voice, video, data traffic. Currently supported test types include: stress testing, function testing, protocol stack testing, negative testing, and handover testing. Stress testing may include pushing eNode B and other LTE elements to capacity and overload conditions. Function testing may include verifying LTE elements deliver desired features and functionality. Full protocol stack testing in LTE networks may include analyzing all LTE protocol layers, not just upper levels. Negative testing may include verifying system response when the system is experiencing error conditions. Handover testing may include verifying that a system properly handles inter/intra eNode B and inter-radio access technology (IRAT) handovers. Specifically, conventional LTE mobile equipment simulation and testing may include verifying: eNode B network element and interfaces (S1, X2, Uu), user and control plane latency, mobility (e.g., handovers, security), radio resource management, negative testing, interoperability with global system for mobile communications (GSM), universal mobile telecommunications system (UMTS), code division Multiple Access (CDMA) 2000 (CDMA2000), worldwide interoperability for microwave access (WiMAX), and/or Internet protocol (IP) multimedia subsystem (IMS), handover scenarios, service and support, real time physical layer (PHY), media access control layer (MAC), and/or radio link control layer (RLC) alarms and error notification, logging and post-analysis per UE.

However, current LTE mobile equipment simulation and testing methods are not capable of realistically simulating the movement of UEs through the network, both physically and logically. For example, in a real-world scenario, a UE may travel a physical path through a network. The physical path may correspond to a logical path through the network topology, such as movement from one sector to another sector within a cell, or a series of handovers from one cell to another cell. Yet the path traveled by the UE may include various problem areas, such as tunnels, buildings, trees, or cell boundaries, where poor signal quality may be expected. If the realistic movement of UEs, including potential movement through problem areas, is not accurately simulated, then mobile network operators may deploy network elements sub-optimally. The result may include adjusting logical network topology (e.g., adding more eNBs) or adjusting the physical location of network nodes (e.g., moving two eNBs closer together) after network elements have been deployed and are in use by network customers. This may be costly for network operators and result in dissatisfied customers.

Accordingly, in light of these difficulties, a need exists for improved methods, systems, and computer readable media for simulating realistic movement of user equipment in an LTE network.

SUMMARY

Methods, systems, and computer readable media for simulating realistic movement of user equipment in an LTE network are disclosed. According to one method, a logical topology of a long term evolution (LTE) access network is defined that includes defining connections between one or more eNodeBs (eNBs). A physical topology of the LTE access network is defined. The defining of the physical topology includes defining locations of the eNBs and sectors, where the physical network topology is mapped to the logical network topology. One or more problem areas are defined within the physical network topology, where the one or more problem areas include locations where signal quality is degraded. One or more paths are defined through the physical network topology. A traffic profile for a user equipment (UE) device is defined. A plurality of messages is generated for simulating the movement of a UE device along a path through the physical network topology.

A system for simulating realistic movement of user equipment in an LTE network is also disclosed. The system includes an input module for receiving a logical topology of a long term evolution (LTE) access network that includes defining connections between one or more eNodeBs (eNBs). The input module also receives a physical topology of the LTE access network that includes defining locations of the eNBs and sectors, wherein the physical network topology is mapped to the logical network topology. The input module also receives one or more problem areas within the physical network topology, wherein the one or more problem areas include locations where signal quality is degraded. The input module also receives one or more paths through the physical network topology and a traffic profile for a user equipment (UE) device. A realistic UE simulator generates a plurality of messages for simulating the movement of a UE device along a path through the physical network topology.

The subject matter described herein for simulating realistic movement of user equipment in an LTE network may be implemented using a non-transitory computer readable medium to having stored thereon executable instructions that when executed by the processor of a computer control the computer to perform steps. Exemplary computer readable media suitable for implementing the subject matter described herein include non-transitory computer readable media, such as chip memory devices or disk memory devices accessible by a processor, programmable logic devices, and application specific integrated circuits. In addition, a computer readable medium that implements the subject matter described herein may be located on a single computing platform or may be distributed across plural computing platforms.

Definitions

As used herein, the term "mobile communications network" refers to a system of nodes (i.e., computing platforms)

that support wireless (with network interfaces) communications between user terminals. Exemplary types of mobile communications networks may include 2G networks (e.g., GSM), 3G networks (e.g., UMTS), and 4G+ networks (e.g., LTE networks). Examples of nodes in such networks include radio network controllers (RNCs) and Enhanced Node Bs (eNodeBs).

As used herein, the term "user equipment" (UE) refers to a mobile communications terminal operated by a user in a mobile communications network. For example, in LTE networks, the UE communicates directly with the eNodeB over an air (i.e., Uu) interface. Exemplary types of UEs include mobile phones and computers with wireless communications capabilities.

As used herein, the term "radio equipment" (RE) refers to a device that serves as the air interface to user equipment and implements analog radio frequency functions. RE may include one or more antennas for communicating with one or more UEs, and may include support for a variety of antenna types and configurations including, but not limited to, single omni-directional antennas and MIMO arrays of directional antennas. Exemplary functions that may be performed by an RE include digital-to-analog (D/A) conversion, analog-to-digital (A/D) conversion, carrier multiplexing, power amplification, and RF filtering.

As used herein, the term "radio equipment controller" (REC) refers to a device in wireless communications network for implementing radio functions of the digital baseband domain. These functions may include, but are not limited to, radio base station control and management, and channel coding and de-coding.

As used herein, the term "cell" refers to a geographical service area served by a mobile network device (e.g., BS/NodeB/eNodeB) in a mobile communications network. A cell may be divided into one or more sectors.

As used herein, the term "sector" refers to a geographical service area (e.g. wedge-shaped) expanding from the mobile network device (e.g., BS/NodeB/eNB) antenna, where sectors are defined by the service areas of directional antennas (e.g., MIMO, beam forming). A mobile network device supporting multiple sectors may support a full channel bandwidth for each sector. Typical configurations include 1, 3, and 6 sectors per cell.

As used herein, the term "multiple input multiple output" (MIMO) refers to the use of multiple antennas for transmission and reception of a single data stream in order to improve data throughput. Using multiple, spatially separated antennas at the mobile network equipment and at the UE, each transmitting/receiving antenna pair provides a path between the UE and the mobile network equipment. Signal analysis can separate each path from the paths formed by other pairs by exploiting imperfections in the channel such as multi-path, delay and phase differences, etc., even though different pairs may use the same frequency. Typical MIMO configurations include 2×2 and 4×4 MIMO corresponding to 2 transmitting/2 receiving antennas and 4 transmitting/4 receiving antennas, respectively.

As used herein, the terms "base transceiver station" (BTS) and "base station" (BS) refer to an entity in a 2G network for communicating with one or more UEs located within its coverage area (e.g., sector, cell) via an air interface. A BS may be associated with one or more antennas for subdividing a cell into one or more sectors, depending on configuration. In cells containing multiple sectors, each sector may be served by an antenna that concentrates the flow of power to that sector. Typical configurations include 3-sector cells, wherein each sector is served by a separate directional antenna. In cells that are not divided into sectors, each cell may be served by a unidirectional antenna that radiates a signal in all directions equally.

As used herein, the term "base station controller" (BSC) refers to a device in a 2G network which controls one or more BTSs. Exemplary functions performed by a BSC may include, but are not limited to, radio channel allocation and controlling inter-BTS handovers. Thus, a BSC may serve to concentrate several low capacity/low utilization connections from a plurality of BTSs into fewer connections of higher utilization to other network devices such as mobile switching centers (MSCs).

As used herein, the term "NodeB" refers to a device in a 3G network that performs functions similar to a BTS. A NodeB contains radio frequency transmitter(s) and the receiver(s) for communicating directly with UEs. The area covered by a NodeB (i.e., a cell) may be divided into one or more sectors, depending on the configuration and type of antenna. Common configurations include a single omni-directional antenna-based cell) (360°, a 3 sector cell) (3×120°, and a 6 sector cell (3 sectors 120° wide overlapping with 3 sectors of different frequency).

As used herein, the term "radio network controller" (RNC) refers to a device in a 3G network controlling one or more NodeBs. Exemplary functions performed by an RNC may include, but are not limited to, radio resource management, mobility management, and encryption.

As used herein, the term "long term evolution" (LTE) refers to a mobile communications network architecture developed by the third generation partnership project (3GPP) to improve UMTS mobile phone standards. An LTE network may include an evolved packet system (EPS), an evolved UMTS terrestrial radio access network (UTRAN)(E-UTRAN), and an evolved packet core (EPC). LTE architecture may be streamlined to optimize network performance, maximize data throughput, and minimize latency as compared to 2G and 3G networks. Rather than four nodes (Node B, RNC, serving general packet radio service (GPRS) support node (SGSN), gateway GPRS support node (GGSN), LTE networks have a simpler configuration including just the eNodeB and the Access Gateway (aGW), where the aGW includes one logical user plane entity (i.e., SAE GW) and one control plane entity (i.e., MME).

As used herein, the term "common public radio interface" (CPRI) refers to a standard for describing a wired communications interface between the REC and the RE components of a networking component, such as a wireless base station. CPRI may be used to divide networking components that utilize a variety of access technologies including LTE, GSM, GPRS, enhanced data for GSM evolution (EDGE), UMTS (including releases R99, R5, R7, high speed packet access (HSPA), and HSPA+evolutionary steps), CDMA, CDMA2000, and WiMAX. CPRI is an industry cooperation aimed at defining the internal interface between two basic building blocks, the so-called radio equipment control (REC) and the radio equipment (RE) itself. CPRI enables flexible and efficient product differentiation for radio base stations and independent technology evolution by dividing networking components (i.e., wireless base stations) into two parts (i.e., the RE and the REC) with a digital connection between the two elements. Data transmitted over a CPRI link consists of digitized samples of the analog baseband signal, plus a low bandwidth control channel. Data carried over the CPRI link is a continuous stream of numbers, representing the digitized samples of the baseband waveform. A CPRI connection can support several "antennas," each "antenna" representing a sector or a MIMO antenna. CPRI does not limit the data rate of connections, but may limit the number of antennas that may be carried on a single CPRI connection.

As used herein, the terms "evolved Node B," "enhanced Node B," "eNodeB," and "eNB" refer to an LTE mobile network entity having functionality similar to that of a radio network controller (RNC) and a base station (BS) in 2G networks or an RNC and a Node B in 3G mobile networks. The eNB communicates directly with LTE UEs and is responsible for header compression, ciphering, reliable delivery of packets, admission control, and radio resource management. By eliminating the RNC from the data path and incorporating its functions into the eNB, packet delay may be decreased and network performance may be increased. As described above, CPRI provides for dividing the eNB into two parts, a radio equipment controller (REC) component and one or more radio equipment (RE) components, where multiple REs may be associated with a single REC being connected together using a wired CPRI link. As used herein, the terms RE and REC will primarily refer to components of an eNB, however it is appreciated that they may also refer to components of other (i.e., non-LTE) networking components. One or more REs and a corresponding REC may either be physically separated or co-located. For example, an RE may be located close to an antenna, while the REC may be located in a more convenient and/or accessible site.

As used herein, the term "Uu" or "air" interface refers to an interface between the UE and mobile network equipment (e.g., the eNB/NodeB/BS) wherein air is the physical transmission medium. For mobile network devices utilizing CPRI, the air interface may more precisely refer to the interface between a UE and an RE.

As used herein, the term "mobile management entity" (MME) refers to a mobile network node that manages non access stratum (NAS)/control plane signaling functions such as network attach, UE authentication, bearer channel setup, and mobility management. For example, an MME may generate temporary identities, allocate the identities to UEs, and authenticate the UE.

As used herein, the term "system architecture evolution" (SAE) gateway (GW) refers to a core network data plane node that manages the data plane, routes, and forwards data packets, and stores and manages user context. Packet routing functions performed by the SAE gateway may include packet screening, IP header compression, ciphering, integrity protection, policy enforcement, and lawful intercept.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for providing user equipment device traffic simulation including realistic movement of user equipment devices in an LTE network. By allowing network operators to model numerous UEs moving realistically through a network coverage area, realistic traffic profiles may be generated. Using these realistic traffic profiles, more accurate testing of LTE network equipment may be performed and LTE network topologies may be optimized by adjusting the physical and/or logical locations of network devices.

Figure 1:
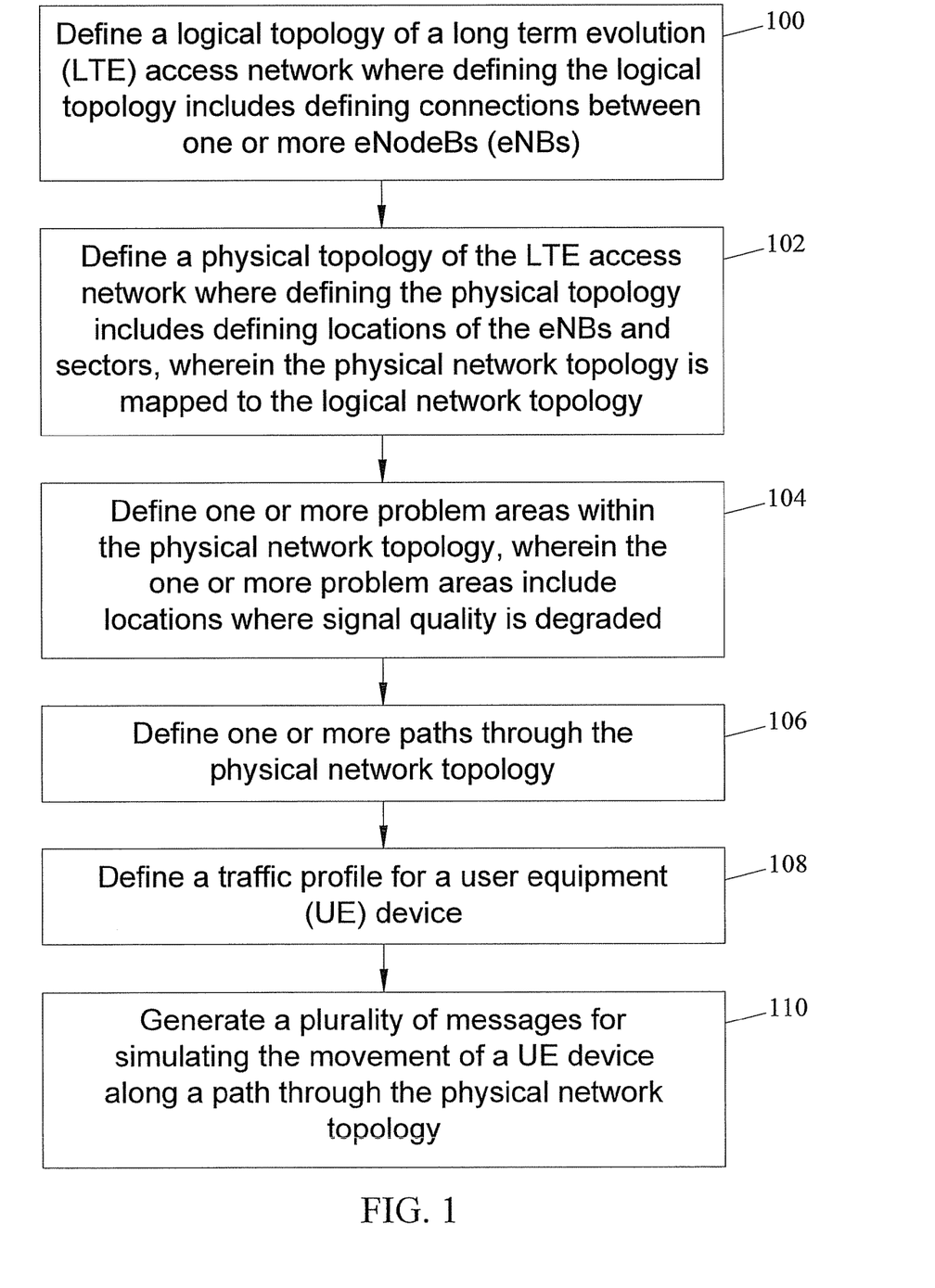
FIG. 1 is a flow chart illustrating an exemplary process for providing user equipment device traffic simulation including realistic movement of user equipment devices in an LTE network according to an embodiment of the subject matter described herein.

FIG. 1 is a flow chart illustrating an exemplary process for providing user equipment device traffic simulation including realistic movement of user equipment devices in an LTE network according to an embodiment of the subject matter described herein. Referring to FIG. 1, in step 100, a logical topology of a long term evolution (LTE) access network may be defined, where defining the physical topology includes defining connections between one or more eNodeBs (eNBs). As used herein, a logical network topology is a network computing term used to describe the arrangement of devices in a network and how they communicate with one another. Logical topologies are bound to network protocols and describe how data is moved across the network. For example, a logical star topology may defined by multiple nodes each being connected to a central hub node. As will be described in greater detail below with respect to FIG. 2A, additional exemplary types of logical network topologies include ring, mesh, star, fully connected, line, tree, and bus topologies. Defining a logical topology may also include defining a set of cells, sectors within the cells, and rules for connecting the cells.

In step 102, a physical topology of the LTE access network may be defined, where defining the physical topology includes defining locations of the eNBs and sectors, wherein the physical network topology is mapped to the logical network topology. In contrast to the logical topology defined above in step 100, the physical topology defines the physical structure of the network (e.g., how devices are connected to the network through the actual cables that transmit data). Moreover, the physical topology may be different from the logical topology. For example, the logical star topology provided in step 100 may include a central hub node located in Los Angeles, Calif., while a second node corresponding to a point on the star may be located in San Francisco, Calif., and the remaining nodes may be located in New York, N.Y. In this case, the physical topology (e.g., as viewed from space) would not resemble its logical topology (i.e., a star). However, the physical and logical topologies may be mapped to one another in a one-to-one correlation by mapping each logical node and each physical node.

In step 104, one or more problem areas within the physical network topology may be defined, where the one or more problem areas include locations where signal quality is degraded. For example, tunnels, underground parking, buildings, trees, cell boundaries, or any area where poor signal quality may be expected may be geographically defined by a user. This may include drawing an area on a map corresponding to the problem area or could be generated automatically based on coordinate, signal strength, and other data.

In step 106, one or more paths through the physical network topology may be defined. For example, a first and second user may each routinely connect to the same two cell towers on weekdays (e.g., towers A and B), yet the paths they traverse may be unique. The first user may live near tower A and work near tower B and may travel along a major road connecting the two locations. The second user, on the other hand, may walk to work using several secondary roads between the two locations which include a variety of problem areas. As a result, even though both users may logically be viewed as moving back-and-forth between cell tower A and cell tower B, they may travel very different paths though the physical network topology and this may impact each user's network experience differently.

In step 108, a traffic profile for a user equipment (UE) device may be defined. The traffic profile may define a number of UEs to be simulated, designate which UEs travel a particular path, define the speed of travel on each path, or define a traffic pattern such as a mixture of data and voice calls. In addition, the traffic profile can define any of the variables mentioned above as changing over time. In another embodiment, the traffic profile may define a minimum, maximum, or average value for any of the variable mentioned above.

When the defined traffic profile is executed, an algorithm may alter the reported channel quality indicator (CQI) values for each UE based on distance from eNBs and proximity to any problem areas. The output of the simulation based on the traffic profile may include a variety of statistics to aid in determining how close to achieving any performance objectives the simulated network topology performed. Statistics may be visually displayed using a graphical user interface (GUI). For example, when the user mouses over a particular cell, a pop up box may display the cell ID or other relevant information. Additionally, the pop up box may allow the user to input the cell ID or other information. The user may also double-click on a particular path and view a list of all UEs associated with that path and details of their traffic profiles such as average, minimum, or maximum travel speed. Other metrics indicating how well a UE is being serviced may be provided as output may include the achieved download and upload traffic rates, error statistics such as the number of dropped frames, dropped calls, handover failures, and the like.

In one embodiment, the values in the rrcMeasurementReports which are sent between eNBs may be altered in order to invoke handovers between sectors and/or between eNBs.

In step 110, a plurality of messages may be generated for simulating the movement of a UE device along a path through the physical network topology.

Figure 2A:
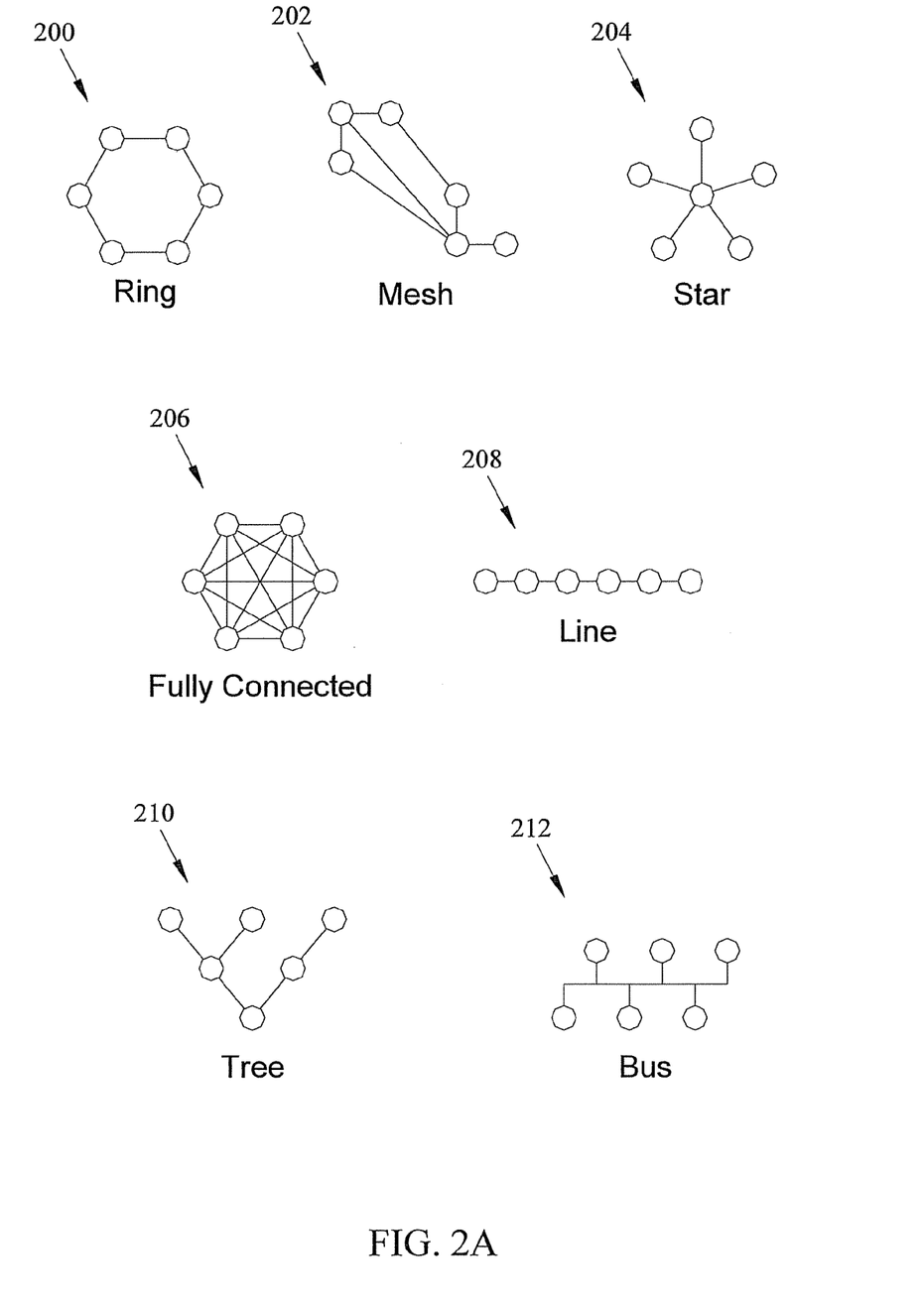
FIG. 2A is a diagram illustrating various network topologies suitable for providing user equipment device traffic simulation including realistic movement of user equipment devices in an LTE network according to an embodiment of the subject matter described herein.

FIG. 2A is a diagram illustrating various network topologies suitable for providing user equipment device traffic simulation including realistic movement of user equipment devices in an LTE network according to an embodiment of the subject matter described herein. Referring to FIG. 2A, ring topology 200 may include a network topology in which each node connects to exactly two other nodes, forming a single continuous pathway for signals through each node. Data travels from node to node, with each node along the way handling every packet. Because a ring topology provides only one pathway between any two nodes, ring networks may be disrupted by the failure of a single link. Mesh topology 202 may be a network topology in which nodes are connected with many redundant interconnections between network nodes. There are two types of mesh topologies: full mesh and partial mesh. Full mesh topology may include when every node has a circuit connecting it to every other node in a network. With partial mesh, some nodes are organized in a full mesh scheme but others are only connected to one or two in the network. Star topology 204 may be a network topology in which each node in a network connects to a central hub. Fully connected topology 206 may be a mesh network in which each of the nodes is connected to each other. Line (or linear) topology 208 may be a network topology in which all nodes are connected to a linear communications link being terminated at each end. Tree topology 210 may be a combination of two or more star networks connected together. Each star network is a local area network in which all nodes are directly linked to a central node. The central nodes of the star networks are connected to a main bus. Thus, a tree network is a bus network of star networks. Bus topology 212 may be a network topology in which a set of nodes are connected via a shared communications line, called a bus.

Figure 2B:
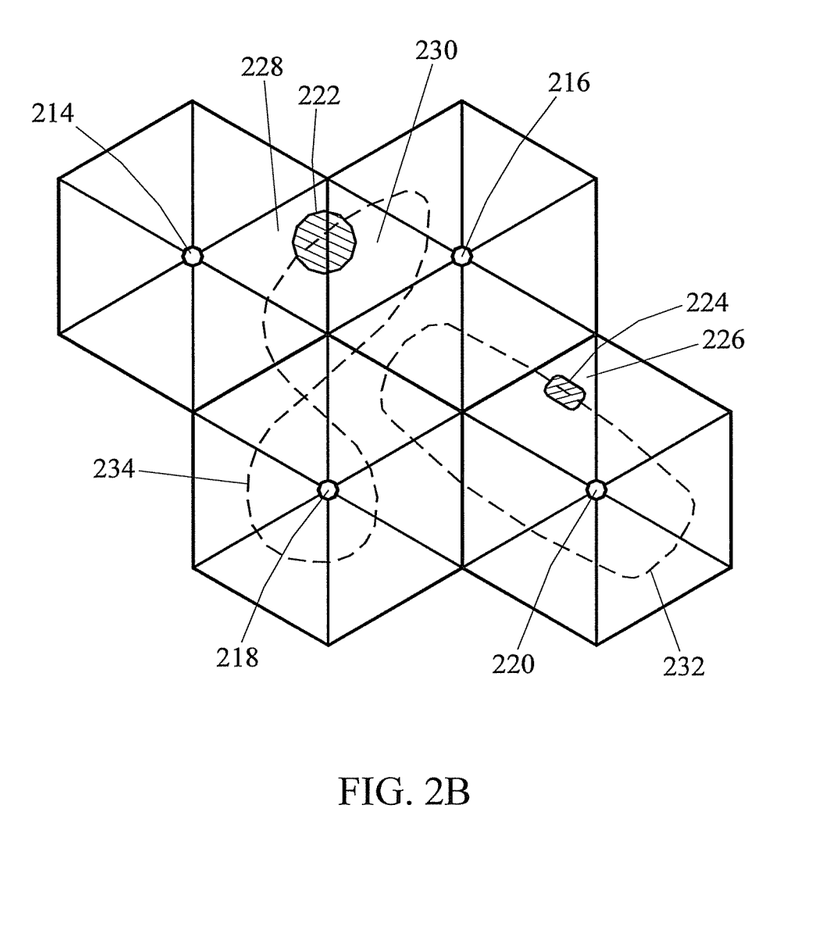
FIG. 2B is a diagram illustrating an exemplary geographic representation for simulating user equipment device traffic including realistic movement of user equipment devices in an LTE access network according to an embodiment of the subject matter described herein.

FIG. 2B is a diagram illustrating an exemplary geographic representation for simulating user equipment device traffic including realistic movement of user equipment devices in an LTE access network according to an embodiment of the subject matter described herein. Referring to FIG. 2B, a plurality of eNBs may be geographically distributed across an area for providing mobile communications coverage for UEs accessing an LTE access network. For example, eNB 214, 216, 218, and 220 may have the physical topology shown. It is appreciated that the physical topology of eNBs 214-220 may be different from their logical topology.

eNBs 214-220 may each support a coverage area, where UEs located within a particular coverage area may communicate with the eNB 214-220 associated with that coverage area. Further, coverage areas may be divided into a number of sectors. For example, the hexagonal coverage areas shown in FIG. 2B may be divided into six equal triangular-shaped sectors.

Figure 3:
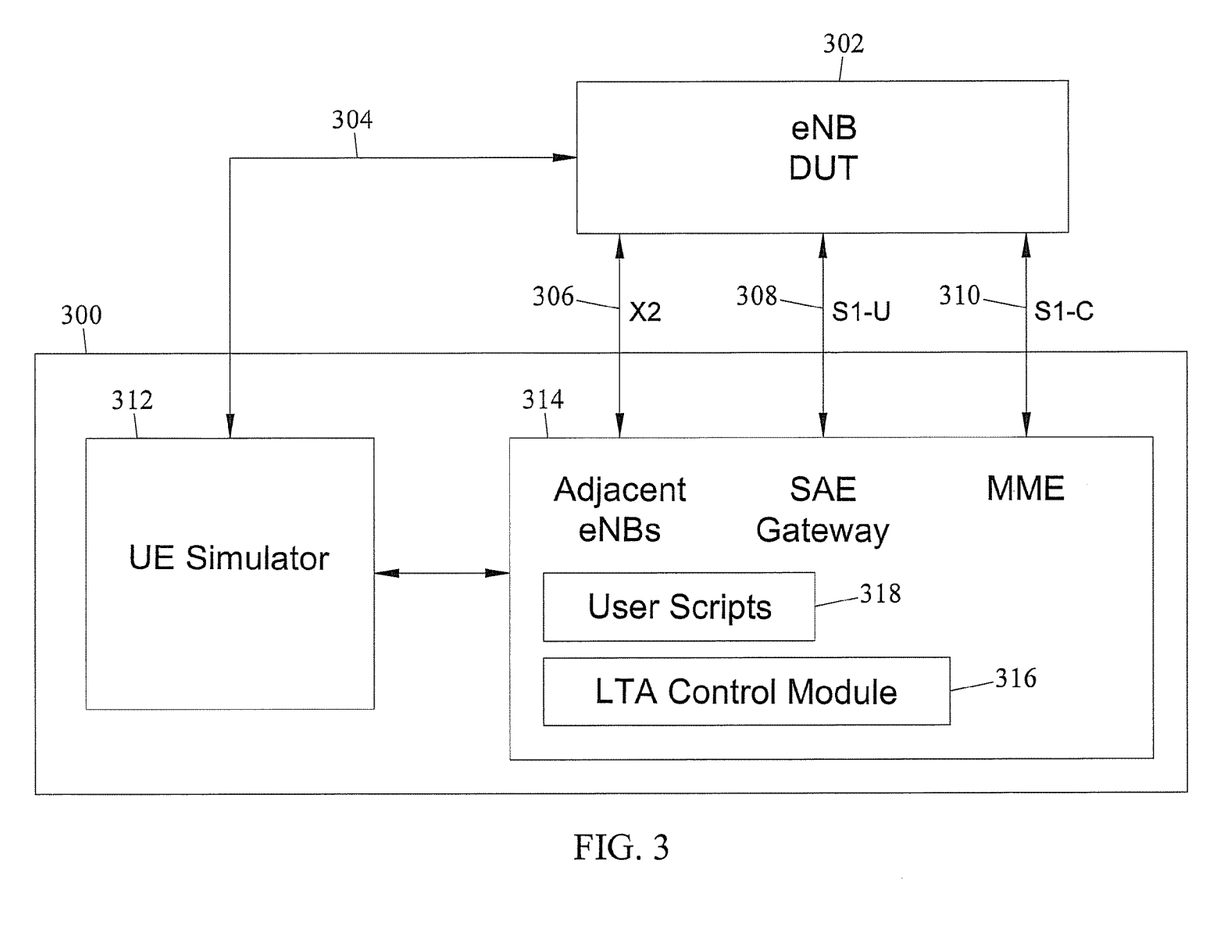
FIG. 3 is a functional block diagram of an exemplary wrap-around configuration of an eNB including a mobile network equipment UE simulator for simulating realistic movement of user equipment in an LTE network according to an embodiment of the subject matter described herein.

FIG. 3 is a functional block diagram of an exemplary wrap-around configuration of an eNB including a mobile network equipment UE simulator according to an embodiment of the subject matter described herein. Referring to FIG. 3, mobile network equipment simulation and testing platform 300 "surrounds" device under test (DUT) 302 by connecting to all of its interfaces 304, 306, 308, and 310 for simulating multiple UEs as well as simulating adjacent eNBs, SAE gateways, and MMEs.

In the embodiment shown in FIG. 3, mobile network equipment simulation and testing platform 300 includes UE simulator 312 for simulating multiple UEs and LTE network node simulator 314 for simulating other non-UE types of LTE nodes which may be connected to an eNB. UE simulator 312 may connect to eNB 302 via CPRI link 304. Mobile network equipment simulation and testing platform 300 may include a load test application (LTA) module 316 for managing simulation of adjacent eNBs, SAE gateways, and MMEs, and for executing user scripts. User scripts 318 may include various predetermined sequences of messages representing simulated actions performed by simulated UEs.

LTA module 316 may help perform realistic UE simulation (in conjunction with UE simulator 204), UE call dispatching (including both real and simulated UEs), UE traffic profile configuration, call automation, quality of service (QoS) testing, selective reporting and statistics, and call tracing.

User scripts 318 may include one or more pre-defined scripts for simulating different LTE traffic/load scenarios in which multiple UEs are connected to an eNB. As used herein, a script includes a program or sequence of instructions that is interpreted or carried out by another program (e.g., LTA control module 316) rather than directly by a computer processor itself (as in the case of a compiled program).

In this case, user scripts 318 may be carried out by LTA control module 316. At any given time, the load on an eNB may include UEs continuously connecting and disconnecting to the network, making and receiving calls, sending data, roaming to another eNB within the network, etc. Moreover, the particular mix of UEs and how they behave may be highly dependent upon the network carrier and/or the DUT's location within the network. Therefore, user scripts 318 may include a wide variety of primitive/basic operations that are typically performed by individual UEs so that a network operator can customize their simulated traffic mix to be similar to real world scenarios of interest.

For example, user scripts 318 may include originating scripts associated with a simulated UE that originates a call/session. Originating scripts may include, but are not limited to, attach, detach, session establishment and release, handover, session initiation protocol (SIP) calls, file transfer protocol (FTP) calls, and hypertext transfer protocol (HTTP) calls. Conversely, user scripts 318 may also include terminating scripts associated with a simulated UE that terminates a call/session such as MME-initiated detach, home subscriber server (HSS),-initiated detach, handover, and SIP/FTP/HTTP calls.

Figure 4:
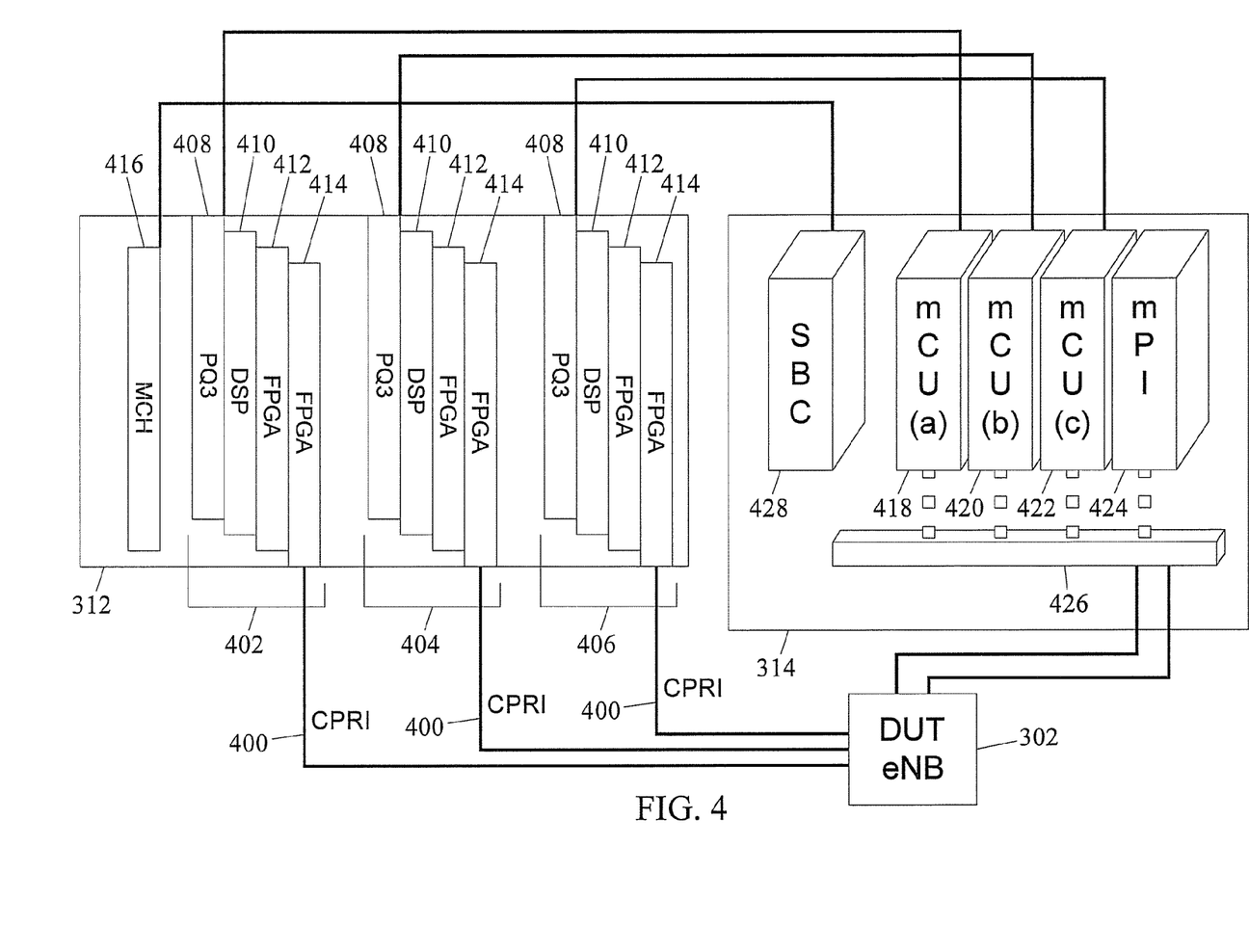
FIG. 4 is a more detailed diagram of the wrap-around configuration shown in FIG. 3 illustrating the use of sector card sets for simulating realistic movement of user equipment in an LTE network according to an embodiment of the subject matter described herein.

FIG. 4 is a more detailed diagram of the wrap-around configuration shown in FIG. 3 illustrating the use of sector card sets for the for simulating realistic movement of user equipment in an LTE network according to an embodiment of the subject matter described herein. Referring to FIG. 4, each external interface of eNB 302 is connected to either UE simulator 312 or LTE network node simulator 314. For example, CPRI links 400 are connected to UE simulator 312 and X2/S1 links are connected to LTE network node simulator 314. Within UE simulator 312, each simulated sector may be implemented using a sector card set. In the embodiment shown in FIG. 4, sector card sets 402-406 may each include four cards (e.g., 408, 410, 412, and 414) for collectively performing functions necessary for simulating realistic movement of user equipment in an LTE network.

LTE network node simulator 314 may include a plurality of processor and interface cards located within a chassis. For example, processor cards may include a mesh computing unit (mCU) card having 5 processors, a compact peripheral component interconnect (cPCI) base card (cBC), and a single board computer (SBC). Interface cards may include a mesh physical interface (mPI) card, and a plurality of multi-port communications cards for supporting ATM, STM, gigabit rear transmission module (RTM), optical RTM, and the like. These cards may be located within a multi-slot chassis which also includes various other supporting hardware and software. For example, the chassis may include one or more universal serial bus (USB), serial, and Ethernet ports, a hard disk drive, random access memory (RAM). In an exemplary configuration, LTE network node simulator 314 may execute an operating system such as SuSE Linux Enterprise Edition (SLED) and provide connections for a monitor, keyboard, and mouse or any other suitable human-computer interface. Additionally, supported internal bus architectures that may be supported may include, but are not limited to, peripheral component interconnect (PCI) and 1Gbps Ethernet in either mesh or star configurations. External interfaces may include optical carrier 1 (OC-1), optical carrier 3 (OC-3), and optical carrier 12 (OC-12), J carrier 1 (J1), E-carrier 1 (E1), T-carrier 1 (T1), Ethernet, serial, common instrument interface (CII), and structure synchronous transport module level-1 (STM-1)/OC-3.

Multi-UE simulator may be similarly configured/implemented using cards located within a chassis having a processor, memory, operating system (OS), internal communications bus, and external communications interfaces. However, in contrast to LTE network node simulator 314, UE simulator 312 may include one or more sector card sets for simulating realistic movement of user equipment in a simulated sector and one or more additional cards for performing various other functions such as communicating with LTE network node simulator 314.

The functionality disclosed herein may be implemented with the IxCatapult IxLoad interface produced by Ixia, Inc. In another embodiment, the functionality may be implemented as a standalone application having an associated application programming interface (API) that could be used by other products without departing from the scope of the subject matter described herein.

An example of a commercially available LTE simulation and testing platform suitable for use with embodiments of the present invention is the DCT2000®/LTE available from Catapult Communications of Mountain View, Calif. LTE simulation and testing platform may include rackmount and desktop form factors, and based on PCI and cPCI industry standards. Mobile network equipment simulation and testing platform 300 may be based on the m500 chassis (e.g., 10U23" rackmount form factor) that includes 18 cPCI card slots and a mesh architecture. Mobile network equipment simulation and testing platform 300 may support all major LTE network elements, protocols, simulators, and network interfaces to support functional and stress testing for e-NodeBs, access and core network elements, interworking of LTE MME with UTRAN and GSM EDGE radio access network (GERAN) networks, and interworking of non-3GPP networks. Specifically, eNBs may be tested by simulating user equipment, other eNodeBs, MMEs, and SAE GWs. Access and core network elements may be tested by simulating packet data network (PDN) Gateways, policy and charging rules functions (PCRFs), SAE GWs, MMEs and e-nodeBs. Interworking of LTE MMEs with UTRAN and GERAN networks may be tested by simulating HSSs and SGSNs. Interworking of non-3GPP networks (e.g. WiMAX) may be tested by simulating the 3GPP authentication, authorization, and accounting (AAA) proxies/servers, mobile access gateways, foreign agents (FA), and IP access system routers. Mobile network equipment simulation and testing platform 300 may support simulated LTE interfaces including, but not limited to, S1, S2a/b/c, S3, S4, S5, S6a, S7, S8 a/b, S10, S11, S12, X2, and LTE-Uu interfaces. Multiple concurrent physical interfaces to the network (or DUT), on-board processors for running multiple protocols simultaneously, and traffic generation for high load voice and video traffic may also be supported by mobile network equipment simulation and testing platform 300. Finally, codec support for mobile network equipment simulation and testing platform 300 may include adaptive multi-rate (AMR) NB, G.711, G.729, G.723, and request for comments (RFC) 3267 codecs.

Sector card sets 402, 404, and 406 may each include PowerQUICC III (PQ3) card 408 for performing main control, script download, UE configuration, and RLC/MAC operation. Digital signal processor (DSP), card 410 may implement physical layer functionality and MIMO signal processing. Field-programmable gate array (FPGA)1 card 412 may perform physical layer channel encoding and decoding operations, while FPGA2 card 414 may perform CPRI handling for CPRI link 400 to DUT eNB 302. Finally, in addition to sector card sets 402-406, UE simulator 312 may include micro telecommunications computing architecture (TCA) carrier hub (MCH) 416 for switching data among cards 408-414 between card sets 402-406 and connecting to LTE network node simulator 314. According to one possible embodiment, UE simulator 312 may include additional sector card sets and/or MCHs without departing from the scope of the subject matter described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for user equipment device traffic simulation including realistic movement of user equipment devices in a network, the method comprising:
   defining a logical topology of a long term evolution (LTE) access network, wherein defining the logical network topology includes defining connections between one or more eNodeBs (eNBs);
   defining a physical topology of the LTE access network, wherein defining the physical network topology includes defining locations of the eNBs and sectors, wherein the physical network topology is mapped to the logical network topology;
   defining one or more problem areas within the physical network topology, wherein the one or more problem areas include locations where signal quality is degraded;
   defining one or more paths through the physical network topology;
   defining a traffic profile for a user equipment (UE) device;
   simulating an LTE associated with the LTE access network;
   generating a plurality of messages for simulating the movement of the UE device along the one or more paths through the physical network topology, wherein generating the plurality of messages includes altering at least one channel quality indicator (CQI) value associated with the plurality of messages, wherein the at least one CQI value is altered based on a proximity of the UE device to the one or more problem areas;
   sending the plurality of messages to an eNB under test; and
   receiving, from the eNB, at lease one message to the simulated LTE network node, where the at least one message includes information about the UE device.

2. The method of claim 1 comprising generating an indication as to how well the UE device is being serviced.

3. The method of claim 1 comprising defining a performance objective for one of the physical and the logical network topologies.

4. The method of claim 3 comprising generating statistics regarding how close to satisfying the objective was achieved.

5. The method of claim 1 wherein defining the logical network topology includes defining one of a ring, mesh, star, fully-connected, line, tree, and bus topology.

6. The method of claim 1 wherein defining the physical network topology includes defining a set of cells, sectors within the cells, and routes for connecting the cells.

7. The method of claim 1 wherein defining one or more problem areas includes defining a size, a shape, and signal degradation characteristics of the problem areas.

8. The method of claim 1 wherein defining one or more problem areas includes defining one of a tunnel, a building, a tree, and an underground parking lot.

9. The method of claim 1 comprising defining a speed at which the UE device travels its associated path through the network.

10. The method of claim 9 wherein defining the speed includes defining one of a constant speed and a variable speed.

11. The method of claim 1 wherein defining one or more paths includes defining a course along which the UE travels.

12. The method of claim 11 wherein the course includes a series of coordinates and a direction.

13. The method of claim 1 wherein defining a traffic profile includes one of defining a number of UEs to be simulated, designating which UEs travel a particular path, defining a speed of travel on each path, and defining a traffic pattern mixture of data and voice calls.

14. A system for user equipment device traffic simulation including realistic movement of user equipment (UE) devices in a network, the system comprising:
   an input module configured to receive:
   a logical topology of a long term evolution (LTE) access network, wherein the logical topology indicates defined connections between one or more eNodeBs (eNBs);
   a physical network topology of the LTE access network, wherein the physical network topology indicates defined locations of the eNSs and sectors, wherein the physical network topology is mapped to the logical network topology;
   one or more problem areas within the physical network topology, wherein the one or more problem areas include locations where signal quality is degraded;
   one or more paths through the physical network topology;
   a traffic profile for a user equipment (UE) device;
   a UE simulator for generating a plurality of messages for simulating the movement of the UE device along the one or more paths through the physical network topology, wherein generating the plurality of messages includes altering at least one channel quality indicator (CQI) value associated with the plurality of messages, wherein the at least one CQI value is altered based on a proximity of the UE device to the one or more problem areas, and for sending the plurality of messages to an eNB under test; and
   an LTE network node simulator for simulating an LTE network node associated with the LTE access network and for receiving at least one message from the eNB, where the at least one message includes information about the UE device.

15. The system of claim 14 wherein the UE simulator is configured to generate an indication as to how well the UE device is being serviced.

16. The system of claim 14 wherein the input module receives a performance objective for one of the physical and the logical network topologies.

17. The system of claim 16 wherein the UE simulator generates statistics regarding how close to satisfying the performance objective was achieved.

18. The system of claim 14 wherein the logical network topology includes one of a ring, mesh, star, fully-connected, line, tree, and bus topology.

19. The system of claim 14 wherein the physical network topology includes a set of cells, sectors within the cells, and routes for connecting the cells.

20. The system of claim 14 wherein the one or more problem areas includes a size, a shape, and signal degradation characteristics of the problem areas.

21. The system of claim 14 wherein the one or more problem areas includes one of a tunnel, a building, a tree, and an underground parking lot.

22. The system of claim 14 wherein the traffic profile defines a speed at which the UE device travels its associated path through the network.

23. The system of claim 22 wherein the speed includes one of a constant speed and a variable speed.

24. The system of claim 14 wherein the traffic profile includes one or more paths defining a course along which the UE travels.

25. The system of claim 24 wherein the course includes a series of coordinates and a direction.

26. The system of claim 14 wherein the traffic profile includes one of a number of UEs to be simulated, a designation of which UEs travel a particular path, a speed of travel on each path, and a traffic pattern mixture of data and voice calls.

27. A non-transitory computer readable medium comprising computer executable instructions embodied in the non-transitory computer readable medium that when executed by a processor of a computer control the computer to perform steps comprising:

defining a logical topology of a long term evolution (LTE) access network, wherein defining the logical network topology includes defining connections between one or more eNodeBs (eNBs);

defining a physical topology of the LTE access network, wherein defining the physical network topology includes defining locations of the eNBs and sectors, wherein the physical network topology is mapped to the logical network topology;

defining one or more problem areas within the physical network topology, wherein the one or more problem areas include locations where signal quality is degraded;

defining one or more paths through the physical network topology;

defining a traffic profile for a user equipment (UE) device;

simulating an LTE network node associated with the LTE access network;

generating a plurality of messages for simulating the movement of the UE device along the one or more paths through the physical network topology, wherein generating the plurality of messages includes altering at least one channel quality indicator (CQI) value associated with the plurality of messages, wherein the at least one CQI value is altered based on a proximity of the UE device to the one or more problem areas;

sending the plurality of messages to an eNB under test; and receiving, from the eNB, at least one message to the simulated LTE network node, where the at least one message includes information about the UE device.

* * * * *